Jan. 5, 1932. D. SCHON 1,840,213
DIRECTION INDICATOR
Filed May 8, 1931 2 Sheets-Sheet 1

WITNESSES
Erich Moebius.
Chris Feinle.

INVENTOR
David Schon.
BY Munn & Co.
ATTORNEYS

Jan. 5, 1932.     D. SCHON     1,840,213
DIRECTION INDICATOR
Filed May 8, 1931     2 Sheets-Sheet 2
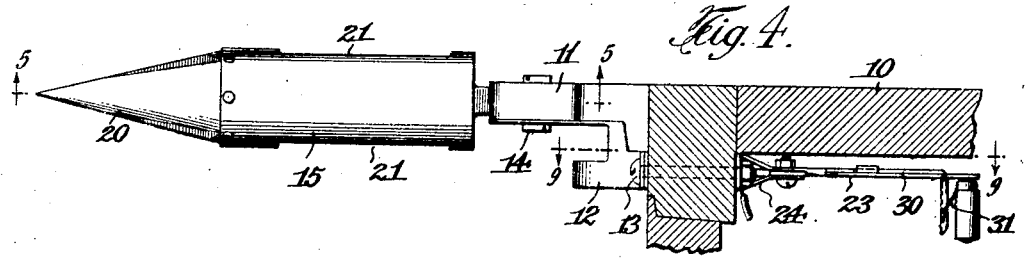
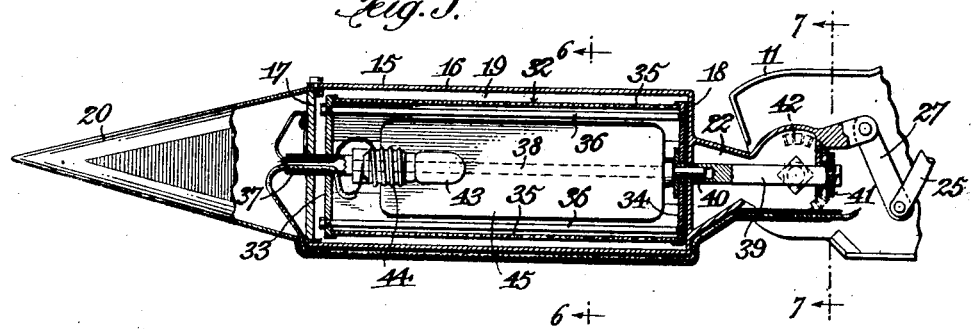
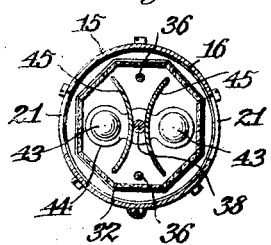
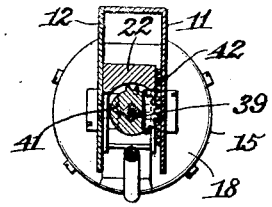
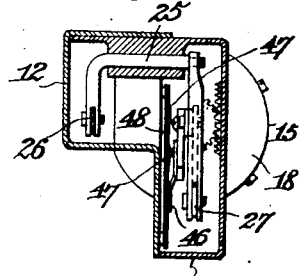
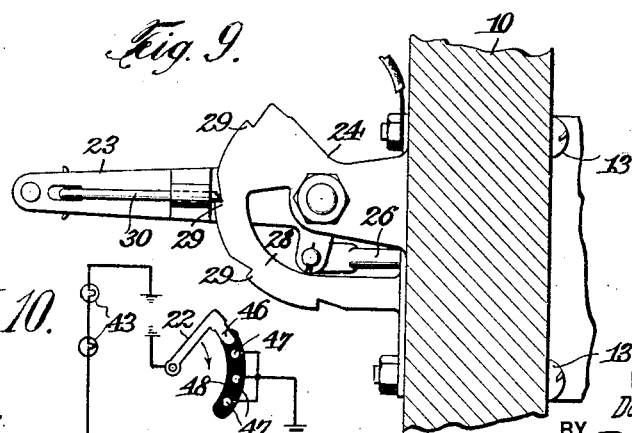
WITNESSES
Erich Moebius.
Chris Peinle.
INVENTOR
David Schon.
BY Munn & Co.
ATTORNEYS Patented Jan. 5, 1932

1,840,213

UNITED STATES PATENT OFFICE

DAVID SCHON, OF RED OAK, IOWA

DIRECTION INDICATOR

Application filed May 8, 1931. Serial No. 535,964.

This invention relates to a device which is designed and adapted for vehicles to indicate changes in travel of the vehicle, and also to signal the drivers of other vehicles.

An object of the invention is the provision of a device of the character mentioned, which may be used in the daytime and also the night time to indicate left and right turns, and also to signal that the vehicle is about to stop.

Another object of the invention is the provision of a device of the character mentioned which will be easy to operate, which will be reliable in operation, and which will be of efficient and substantial design.

The invention also resides in the combinations, construction and operation of the parts; and other objects of the invention will appear when the following specification is read in connection with the accompanying drawings, in which Figure 1 is a rear view of the device applied to the driving corner of an automobile body and indicating a left turn in full lines, and further illustrating other indicating positions in dotted lines;

Figure 4 is a plan view of the device with the parts as disposed in Figure 1;

Figure 5 is an enlarged section on the line 5—5 of Figure 4;

Figure 6 is a section on the line 6—6 of Figure 5;

Figure 7 is a section on the line 7—7 of Figure 5;

Figure 8 is a section on the line 8—8 of Figure 2;

Figure 9 is an enlarged section on the line 9—9 of Figure 4;

Figure 10 is a diagrammatic view of the electric circuit and connected parts.

Figure 1:
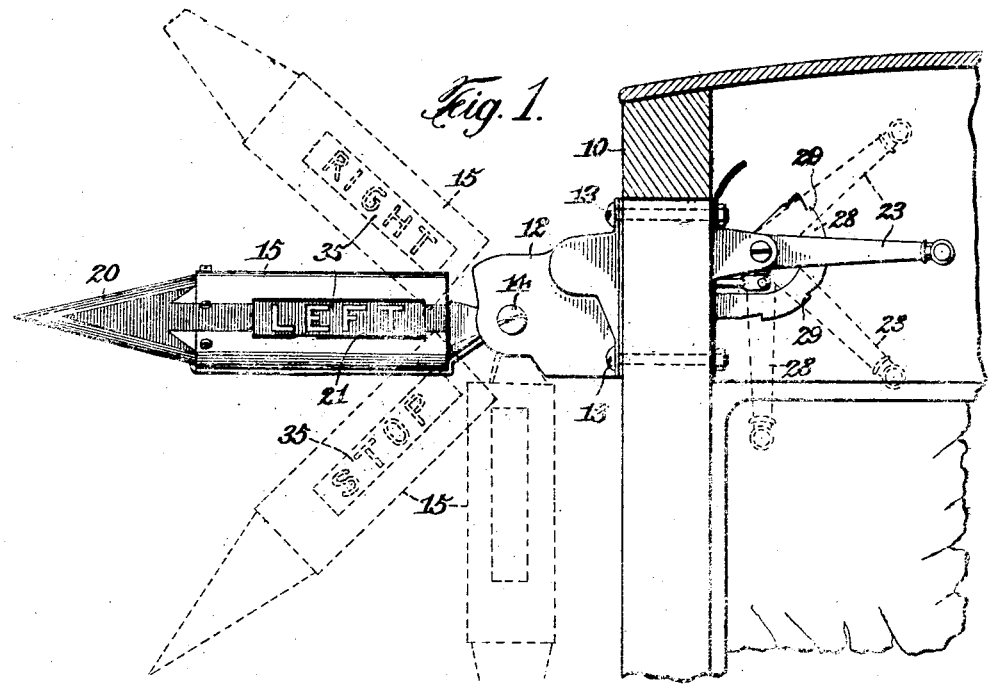
Figure 2:
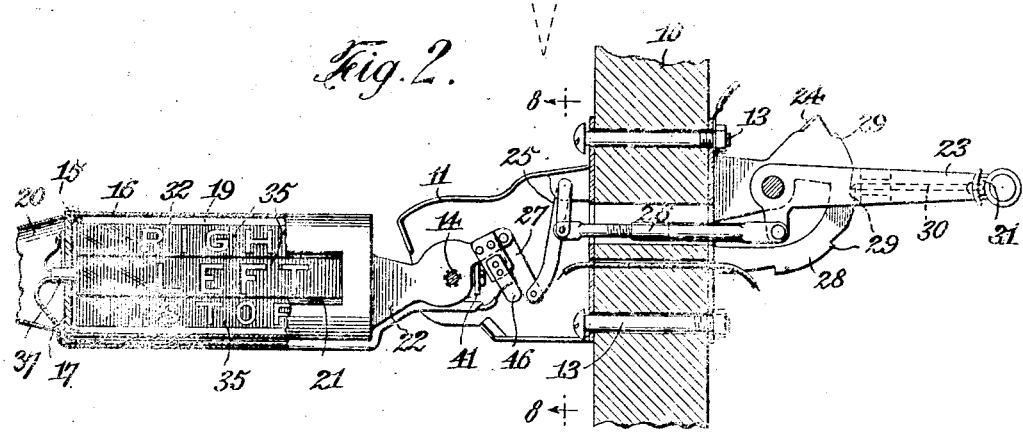
Figure 2 is a view similar to Figure 1, but is shown partly in section and portions broken away to illustrate certain features of the device.
Figure 3:
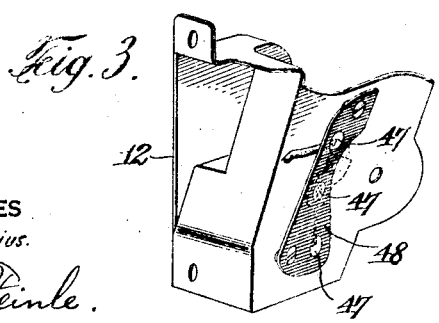
Figure 3 is a perspective view of a part of the casing bracket together with a part of the switch for controlling the lamps.

Referring now more particularly to the drawings it will be apparent that there has been shown, by way of example, the driving corner 10 of an automobile body. This is usually the left-hand front corner of the automobile body. The device of the present invention is applied to this corner 10. The device includes bracket parts 11 and 12 which are designed to be brought together to form a casing and are adapted to be secured to the corner 10 by securing elements such as bolts and nuts 13. The parts 11 and 12 support a horizontal pivot 14. Use is made of an indicator casing 15 of sectional construction. The casing 15 consists of a cylindrical wall 16 and end walls 17 and 18 which form a compartment 19; there being a pointed or cone-shaped section 20 secured to the outer end of the casing. The wall 16 has sight openings 21 therein diametrically opposite to each other. If desired, the casing 15 may have painted thereon arrows at the front and rear, preferably red in color. The casing end 18 has a hollow arm 22 secured thereto or formed integral therewith through which the pivot 14 extends, to thus mount the casing for pivotal or swinging movement up and down, into and out of different indicating or signaling positions from a non-indicating position, in which the casing will be disposed directly downward or vertically disposed.

Means is provided for causing the up and down movement of the casing 15 to the different positions. The said means includes a hand lever 23 of the bell crank type, fulcrumed on a bracket 24 secured to the corner 10 by the bolts and nuts 13. A crank lever 25 is mounted on the inside of the bracket part 11. The levers 23 and 25 are connected to each other by an adjustable rod 26 which extends through the openings in the corner 10 and bracket part 11 and the bracket 24. The lever 25 is connected with the arm 22 by a link 27. The connection and arrangement of parts is such that when the hand lever 23 is in a substantially vertically disposed position, the casing 15 will also be disposed in a similar position, and when the lever 23 is swung upwardly, the casing will move in a vertical plane to different indicating positions to indicate a left turn, a right turn, and also to indicate that the vehicle is about to stop. When it is desired to indicate a left turn, the casing will be disposed in a horizontal position, and a right turn will be indicated when the casing is disposed upwardly at an angle of substantially 45°, and when the casing 15 is disposed downwardly at an angle of substantially 45° it will indicate that the vehicle is about to stop.

In order to releasably hold the casing 15 in the different positions mentioned above there is provided means presently to be described. The bracket 24 embodies a sector 28 corresponding to the axis of the lever 23. The sector has stops 29 corresponding to the left, right and stop positions of the casing 15. A latch member 30 is carried by the lever 23 and is under the influence of a spring 31 also carried by the lever. The latch member 30 cooperates with the stops 29 in the movement of the lever 23, to hold the casing 15 in its indicating positions.

In accordance with another feature of the invention, use in made of an indicator element 32 of hollow construction and of such size as to be arranged within the compartment 19 of the casing 15. The element 32 consists of ends 33 and 34 and eight panels 35 of glass which are held in place between the ends 33 and 34 by long bolts 36 secured to the ends 33 and 34. Two of the panels 35 arranged diametrically opposite to each other contain the word "Left", the next two panels arranged diametrically opposite each other contain the word "Right", and the next two panels arranged diametrically opposite each other below the word "Left" have the word "Stop". The remaining two panels 35 are of a blank and may be colored in contrast to the other panels, which are preferably red. All of the panels 35 will be translucent. A shaft consisting of sections 37, 38 and 39 is employed, the section 37 being hollow and being fixed to the end wall 17 of casing 15, the section 38 being connected with the section 37 at one end and its opposite end being loosely fitted in the section 39, as at 40, and the section 39 being secured to the end wall 34 of the indicator element 32 and being supported by the end wall 18 of the casing 15. The indicator element 32 is thus mounted for rotation within the compartment 19, and its panels 35 may be brought selectively into registration with the openings 21. The indicator element 32 is rotated in response to the movement of the casing 15, and this is accomplished by the provision of the toothed wheel 41 fixed to the shaft section 39, and a toothed sector 42 on the bracket part 11. The teeth of the wheel 41 mesh with the teeth of the sector 42 so that when the casing 15 is moved to its indicating positions, the element 32 will be rotated to different positions to bring the signals "Left", "Right" or "Stop" in registration with the openings 21 according to the positions of the casing 15.

In order that the device will serve in the night time, there are provided electric lamps 43 which are received in sockets forming a part of a socket member 44 carried by the shaft section 37 within the element 32. Reflectors 45 are arranged within the element 32 in relation to the lamps 43 to reflect the rays of light from the lamps through the panels 35 in registration with the openings 21. The reflectors are secured to the shaft section 38. A switch is employed consisting of a contact member 46 carried by the arm 27, and three contact members 47 are secured to an insulator 48 secured to the bracket part 12. The contact members 47 are connected together in series in an electric circuit 49 including a source of electrical energy 50, and the lamps 43 also connect in series in the circuit, and one terminal of one of the lamps being grounded to the casing 15, and the contact member 46 also being grounded to the casing 15. The provision and arrangement is such that in the movement of the casing 15 to its indicating positions, the contact member 46 will engage one of the contact members 47, as the case may be, to close circuit 49 through the lamps 43 to light the same, while the casing 15 is in the several indicating positions. When the casing 15 is in its non-indicating or vertically disposed position the switch will be open and the lamps 43 will be out.

Claims:

1. A direction indicator comprising an indicator casing mounted for pivotal movement into and out of different indicating positions, means to move said casing into and out of the indicating positions, and means to releasably hold the casing in the different positions, said first means comprising a hand lever, a crank, an adjustable rod pivotally connected with the crank and lever, and a link pivotally connected with said crank and the casing.

2. In a device of the class described, the combination of a casing having a sight opening therein, an indicator element arranged within said casing and having indices registrable with said opening, a shaft consisting of a tubular section fixed to one end wall of the casing, an intermediate section having one end secured to said tubular section, and a third section secured to one end wall of said element and rotatably supported by the other end wall of said casing and the other end wall of said element being rotatably supported by said fixed section, the remaining end of said intermediate section loosely fitting in said third section, whereby said element is rotatably mounted, electric lamps and their socket member arranged within said element and carried by said tubular shaft section, and electrical conductors extending through said tubular shaft section and connected with said lamps.

3. In a device of the class described, the combination of a casing having a sight opening therein, an indicator element arranged within said casing and having indices registrable with said opening, a shaft consisting of a tubular section fixed to one end wall of the casing, an intermediate section having one end secured to said tubular section, and a third section secured to one end wall of said element and rotatably supported by the other end wall of said casing and the other end wall of said element being rotatably supported by said fixed section, the remaining end of said intermediate section loosely fitting in said third section, whereby said element is rotatably mounted, electric lamps and their socket member arranged within said element and carried by said tubular shaft section, electrical conductors extending through said tubular shaft section and connected with said lamps, and means connected with said third shaft section to rotate said element to bring it into different positions in relation to casing to selectively display said indices.

4. In a device of the class described, the combination of a casing having a sight opening, an indicator consisting of end walls and indicia panels secured to said walls and forming therewith a hollow structure; a tubular member fixed to one end of the casing, an intermediate member extending interiorly of said indicator and having one end secured to said tubular member, and a third member secured to one end wall of the indicator and rotatably supported by the adjacent end of the casing, the other end wall of the indicator being rotatably supported by said tubular member, the remaining end of said intermediate member loosely fitting in said third member, the provision and arrangement being such as to mount the indicator for rotation to selectively display said panels at said opening.

5. In a device of the class described, the combination of a casing having a sight opening, an indicator consisting of end walls and translucent indicia panels secured to said walls and forming therewith a hollow structure; a tubular member fixed to one end of the casing, an intermediate member extending interiorly of said indicator and having one end secured to said tubular member, a third member secured to one end wall of the indicator and rotatably supported by the adjacent end of the casing, the other end wall of the indicator being rotatably supported by said tubular member, the remaining end of said intermediate member loosely fitting in said third member, the provision and arrangement being such as to mount the indicator for rotation to selectively display said panels at said opening, illuminating means and reflectors therefor arranged within the indicator and supported by said intermediate member.

DAVID SCHON.